United States Patent Office 3,203,853
Patented Aug. 31, 1965

3,203,853
SYNERGISTIC MIXTURES OF INSECTICIDES
Albert Jäger, Berlin-Hermsdorf, and Horst Peissker, Wolfenbuttel, Germany, assignors to Schering, A.G., Berlin, Germany
No Drawing. Filed Apr. 20, 1962, Ser. No. 188,952
Claims priority, application Germany, May 6, 1961, Sch 29,672
6 Claims. (Cl. 167—30)

This invention relates to insecticides, and more particularly to synergistic mixtures of certain carbamic acid derivative esters which have an insecticidal effect greater than the combined effect of the constituents.

The esters of carbamic acid derivatives include several compounds which have found a useful field of application as insecticides. Other esters of this class are non-toxic to insects, or of such slight toxicity as not to be useful insecticides when employed in practical amounts and concentrations.

The strongly insecticidal esters of carbamic acid derivatives will be referred to hereinafter as "active carbamate esters" while the practically non-toxic members of the group will be termed "inactive carbamate esters." Among the active carbamate esters, the following compounds have found wide acceptance and use as insecticides:

(A) 1-naphthyl-N-methylcarbamate
(B) 3-methyl-5-isopropylphenyl-N-methylcarbamate
(C) 3-methyl-5-pyrazolyl-N-dimethylcarbamate
(D) 5-(3-methyl-1-phenylpyrazolyl)-N-dimethylcarbamate
(E) 5-(1-isopropyl-3-methylpyrazolyl)-N-dimethylcarbamate It has now been found that the insecticidal effects of these active carbamate esters can be greatly enhanced by addition of certain inactive carbamate esters which have no significant insecticidal effects when used by themselves in corresponding amounts. A mixture of at least one active carbamic acid ester with at least one such inactive ester has an insecticidal effect which is frequently many times greater than the combined effect of the individual components of the synergistic mixtures.

Carbamic acid esters have the formula

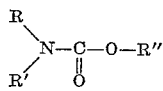

In the inactive carbamate esters of this invention R may be hydrogen, an alkyl, alkylenyl, cycloalkyl, aralkyl, or nitroso radical; R' may be hydrogen, an alkyl, alkylenyl, cycloalkyl, aralkyl, or substituted phenyl radical. R and R' together with the nitrogen atom of the carbamic acid structure may also form a heterocyclic ring which may also contain hetero atoms other than the aforementioned nitrogen atom; R" may be an alkyl, alkylenyl radical, a chain containing a plurality of carbon atoms together with oxygen, sulfur, or nitrogen atoms, or any one of these radicals further substituted by an aryloxy radical, a phenyl radical, and particularly an alkyl substituted phenyl radical, and a cycloalkyl radical. In preferred embodiments of this invention, R" is a phenyl radical, an alkyl substituted phenyl radical, a cycloalkyl radical, an ethylmercaptoethyl radical, an allyloxyethyl radical, a phenoxyethyl radical, or a radical of the formula

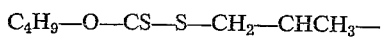

The inactive carbamate esters of the invention are generally characterized by little if any lethal effect on insects in vitro when applied in amounts up to about 0.8 mg./dm.$^2$ i.e., milligrams per square decimeter.

The synergistic mixtures of active and inactive carbamate esters according to this invention may be employed as insecticides alone or in combination with other pesticides, such as different insecticides, but also in combination with acaricides, fungicides, and the like. They are preferably applied to plants in the manner conventional for plant protecting agents, that is, in mixtures with liquid or solid carriers which themselves are practically inert. Suitable liquid carriers include water, mineral oil, or other organic solvents. Suitable solid carriers include bentonite, fuller's earth, gypsum, limestone, diatomaceous earth, pyrophyllite, silica, and talcum. Insecticidal compositions containing the synergistic mixtures of the invention as their active agents may further contain adjuvants such as emulsifiers, wetting agents, bonding agents, propellent gases, perfumes, stabilizers, attractants and repellents. The compositions may have the physical or mechanical properties of dusting powders, of granular solid particles, of liquids capable of being discharged from nozzles in a spray, stream, or a fine mist. The mixtures of the invention readily lend themselves to formulation of aerosols or fumigants.

The amounts of the synergistic mixtures to be employed in the protection of plants for their insecticidal or acaricidal effects may vary greatly with specific conditions. The ratio of the active and inactive carbamic acid esters in the synergistic mixture, the compounding method, the method of application, the result to be achieved, the nature of the pests to be combatted are only a few of the factors which have to be considered.

Effective compositions may thus be prepared containing the synergistic mixtures of the invention in amounts between about 0.1 and 90 percent by weight. These compositions may then be employed in concentrations as low as 0.001 percent by weight. For most applications, the synergistic mixtures of the invention will be applied to advantage in concentrations of 0.025 to 10 percent in conjunction with liquid or solid carriers. Only in exceptional cases, the synergistic mixtures are applied in concentrations as high as 25 percent by weight.

The useful ratio of the active and inactive carbamic acid esters in the synergistic mixtures of the invention is capable of wide variation. Between about 25 parts and one part of the active carbamic acid esters may be mixed with about one part of 50 parts of the inactive esters. For reasons of economy and for other considerations, the usual amount of the active esters is from one to five parts, that of the inactive esters from 5 to 50 parts by weight.

The synergistic effects available with mixtures of the afore-described active and inactive carbamic acid esters are evident from the following specific examples which are merely illustrative, and not intended to limit the invention. In these examples the effects of synergistic mixtures of active and inactive carbamate esters on different test animals are compared with the effects of the esters taken singly. All results reported are averages obtained from at least two individual tests of the type described in detail hereinafter.

The active carbamate esters reported on in the specific examples are selected from the list of five esters identified hereinabove by capital letters (A) to (E). The inactive esters employed in synergistic mixtures with the active esters are taken from the following list in which the individual inactive esters are assigned numerals (1) to (9), respectively:

(1) 3-methyl-5-isopropyphenyl-N-camphylcarbamate
(2) Bornyl-N-methylcarbamate
(3) Cyclopentyl-N-methylcarbamate
(4) Cyclohexyl-N-methylcarbamate
(5) Ethylmercapotethyl-N-methylcarbamate
(6) Allyloxyethyl-N-methylcarbamate
(7) Phenyloxyethyl-N-methylcarbamate
(8) O-butyl-S-2-(N-methylcarbamyl) - propyl-dithiocarbonate
(9) 2-Isopropyl-3-methylphenyl-N-diisopropylcarbamate The test animals included adult granary weevils (*Sitophilus granarius* L.), caterpillars of the gypsy moth (*Lymantria dispar* L.) in the fourth larval stage, and stick insects (*Carausius morosus* Brunner) in the fourth larval stage.

EXAMPLE 1

Tests on Sitophilus granarius L.

*Test insects.*—The weevils are grown in large glass containers on wheat grains at a temperature of 22 to 25° C. and a relative humidity of 50 to 60 percent. For each test run, about 100 adult weevils are placed in a treated Petri dish.

*Method of applying active agents.*—The lower halves of Petri dishes are treated on a revolving turntable with the composition tested in an amount of 4 mg./cm.$^2$. The tested substance is applied by means of a spray gun equipped with a glass nozzle at a constant pressure of 0.5 kg./cm.$^2$.

*Concentration of active agent.*—The synergistic mixtures and individual carbamate esters tested are dissolved in acetone together with an emulsifying agent to form standard stock solutions. These stock solutions are then diluted with varying amounts of water prior to spray application. Initial tests are performed uniformly with solutions of 2000 p.p.m., i.e., parts per million, corresponding to 8 micrograms of active agent per square centimeter.

*Toxicity tests.*—About 100 granary weevils are placed in each treated lower Petri dish after thorough drying of the spray coating. The dishes are closed and stored in a dark room for the periods specified.

*Evaluation of results.*—The weevils are counted after the test period in three separate classes. The weevils of one class are permanently on their backs indicating they are dead. Those of the second class are damaged. The weevils of the third class are the survivors which show no sign of damage. The percent effectivity of the agent tested is calculated according to Abbott's formula.

TABLE 1

| Compound | Amount, mg./dm.$^2$ | Effect, percent after 20 hrs. |
|---|---|---|
| (a) Active carbamate ester— | | |
| (A) | 0.02 | 29 |
| (b) Inactive carbamate esters: | | |
| (1) | 0.8 | 0 |
| (2) | 0.8 | 0 |
| (3) | 3.2 | 0 |
| (4) | 3.2 | 0 |
| (5) | 3.2 | 8 |
| (6) | 3.2 | 0 |
| (7) | 3.2 | 6 |
| (8) | 3.2 | 8 |
| (9) | 0.8 | 0 |
| (c) Synergistic mixtures— | | |
| A+1 | 0.02+0.2 | 90 |
| A+2 | 0.02+0.2 | 88 |
| A+3 | 0.02+0.2 | 78 |
| A+4 | 0.02+0.2 | 64 |
| A+5 | 0.02+0.2 | 59 |
| A+6 | 0.02+0.2 | 76 |
| A+7 | 0.02+0.2 | 95 |
| A+8 | 0.02+0.2 | 100 |
| A+9 | 0.02+0.2 | 74 |

EXAMPLE 2

Tests on Lymantria dispar L.

*Test insects.*—Larvae of *Lymantria dispar* L. after hatching from eggs produced by laboratory animals are grown on oak shoots. Five or ten larvae in the fourth larval stage are employed in each test run.

*Method of applying active agents.*—For a test of contact effect, larvae of uniform size and in the same stage of development are placed on filter paper in open Petri dishes and are treated on a revolving support as described in Example 1, above.

*Concentration of active agents.*—The individual carbamate esters and mixtures are prepared as described in Example 1.

*Toxicity tests.*—The treated larvae are placed on untreated oak shoots in wire gauze cages for the periods specified in Table 2, below.

*Evaluation of results.*—The animals are inspected at intervals of 24 hours and are grouped in three classes; dead animals which do not react to contact, visibly damaged animals which have fallen off the feed plants, and survivors not showing symptoms. The percent effectiveness of the agents is calculated according to Abbott's formula.

The results of two series of experiments performed on 5 and 10 animals respectively for each run are combined in the report tabulated in Table 2.

TABLE 2

| Compound | Amount, mg./dm.$^2$ | Effect percent, after— | | |
|---|---|---|---|---|
| | | One day | two days | three days |
| (a) Active carbamate ester— | | | | |
| (A) | 0.08 | 10 | 20 | 20 |
| (b) Inactive carbamate esters: | | | | |
| (1) | 0.8 | 0 | 0 | 10 |
| (3) | 0.4 | 0 | 0 | 0 |
| (4) | 0.4 | 0 | 0 | 0 |
| (7) | 0.4 | 0 | 0 | 0 |
| (c) Synergistic mixtures: | | | | |
| A+1 | 0.08+0.4 | 47 | 53 | 60 |
| A+3 | 0.08+0.4 | 60 | 87 | 87 |
| A+7 | 0.08+0.4 | 40 | 40 | 60 |

EXAMPLE 3

Tests on Carausius morosus Brunner

*Tests insects.*—The heterometabolic larvae are grown after hatching on plants of Tradescantia. Fifteen animals in the fourth larval stage are employed in each test run.

*Method of applying active agents.*—To test contact effects, larvae in the same development stage and of uniform size are briefly dipped in aqueous emulsions of the substance tested and are then placed on filter paper to drain excess liquid.

*Concentration of active agent.*—The individual carbamate esters and mixtures are dissolved and diluted as described in Example 1.

*Toxicity tests.*—Fifteen uniformly treated animals are kept in wire gauze cages on Tradescantia plants for the periods listed in Table 3.

*Evaluation of results.*—The animals are inspected in 24-hour intervals and classified in four groups as follows: dead animals immobile even when touched, severely damaged animals which do not move spontaneously and react to touch with feeble movement of the extremities, less severely damaged animals which retain some ability to move around, and survivors free from visible symptoms of damage and feeding on plants. The percent effectivity of the agent tested is calculated according to Abbott's formula.

Table 3 combines the results of three independent series of experiments.

TABLE 3

| Compound | Concentration, p.p.m. | Effect, percent, after | | | | |
|---|---|---|---|---|---|---|
| | | 1 | 2 | 3 | 4 | 5 days |
| (a) Active carbamate esters: | | | | | | |
| (A) | 200 | 13 | 7 | 7 | 7 | 10 |
| (B) | 400 | 0 | 0 | 10 | 20 | 20 |
| (b) Inactive carbamate esters: | | | | | | |
| (1) | 2,000 | 0 | 0 | 0 | 0 | 0 |
| (2) | 1,000 | 0 | 0 | 0 | 0 | 0 |
| (3) | 1,000 | 0 | 0 | 0 | 0 | 0 |
| (4) | 2,000 | 0 | 0 | 0 | 0 | 20 |
| (5) | 2,000 | 0 | 0 | 0 | 0 | 0 |
| (6) | 2,000 | 0 | 0 | 0 | 0 | 10 |
| (7) | 1,000 | 0 | 0 | 0 | 0 | 0 |
| (8) | 1,000 | 0 | 0 | 0 | 10 | 20 |
| (c) Synergistic mixtures: | | | | | | |
| A+1 | 200+400 | 70 | 83 | 93 | 93 | 100 |
| A+2 | 200+1,000 | 67 | 63 | 60 | 60 | 60 |
| A+3 | 200+1,000 | 33 | 33 | 40 | 40 | 40 |
| A+4 | 200+1,000 | 60 | 80 | 80 | 80 | 90 |
| A+5 | 200+1,000 | 40 | 40 | 40 | 40 | 50 |
| A+6 | 200+1,000 | 60 | 70 | 70 | 70 | 70 |
| A+7 | 200+1,000 | 53 | 53 | 60 | 60 | 60 |
| A+8 | 200+1,000 | 50 | 60 | 60 | 70 | 70 |
| B+4 | 400+1,000 | 33 | 47 | 63 | 63 | 63 |
| B+6 | 400+1,000 | 43 | 58 | 65 | 100 | 100 |
| B+7 | 400+1,000 | 33 | 54 | 70 | 70 | 80 |

The results reported above are representative of those achieved by combination of the active carbamate esters (A) to (E) with the inactive esters (1) to (9). In all instances, the insecticidal effect of the mixtures is very much greater than the combined effects of the mixture constituents. Field tests with compositions containing the synergistic mixtures of the invention as their active ingredients have confirmed the results obtained in vitro under controlled conditions. In these field tests, the synergistic mixtures were combined with inert carriers and adjuvants in a manner well known in itself, and described hereinbefore. After infested plants were dusted with solid compositions or were sprayed with liquid compositions an almost complete control of the insect pests was obtained whereas control plants grown under practically identical initial conditions showed rapid increase of insect damage.

While the invention has been described with particular reference to specific embodiments, it is to be understood that it is not limited thereto, but is to be construed broadly and restricted solely by the scope of the appended claims.

We claim:

1. An insecticidal composition containing as the effective agent a mixture of a carbamic acid ester selected from a first group consisting of 1-naphthyl-N-methylcarbamate, 3-methyl-5-isopropylphenyl-N-methylcarbamate, 3-methyl-5-pyrazolyl-N-dimethylcarbamate, 5-(3-methyl-1-phenylpyrazolyl)-N-dimethylcarbamate, 5-(1-isopropyl-3-methylpyrazolyl)-N-dimethylcarbamate, and a carbamic acid ester selected from a second group consisting of 3-methyl-5-isopropylphenyl-N-camphylcarbamate, bornyl-N-methylcarbamate, cyclopentyl-N-methylcarbamate, cyclohexyl-N-methylcarbamate, ethylmercaptoethyl-N-methylcarbamate, allyloxyethyl-N-methylcarbamate, phenyloxyethyl-N-methylcarbamate, O-butyl-S-2-(N-methylcarbamyl)-propyl dithiocarbonate, and 2-isopropyl-3-methylphenyl-N-diiosopropylcarbamate, the ratio of said ester of said first group to said ester of said second group in said composition being between 25 to 1 and 1 to 50.

2. A composition as set forth in claim 1, wherein said carbamic acid ester of said first group is 1-naphthyl-N-methylcarbamate.

3. A composition as set forth in claim 1, wherein said carbamic acid ester of said first group is 3-methyl-5-isopropylphenyl-N-methylcarbamate.

4. A method of protecting a plant which comprises applying to a surface of said plant the composition of claim 1 in insecticidal amounts, the applied amount of said carbamic acid ester being not substantially in excess of 0.8 milligrams per square decimeter of said surface.

5. A method as set forth in claim 4, wherein said carbamic acid ester of said first group is 1-naphthyl-N-methylcarbamate.

6. A method as set forth in claim 4, wherein said carbamic acid ester of said first group is 3-methyl-5-isopropylphenyl-N-methylcarbamate.

References Cited by the Examiner

UNITED STATES PATENTS

| 2,677,698 | 4/54 | Deutschman et al. | 167—30 |
| 2,903,478 | 9/59 | Lambrech | 167—30 |
| 3,035,969 | 5/62 | Hartle et al. | 167—22 |

FOREIGN PATENTS 852,920   11/60   Great Britain.

OTHER REFERENCES

Agr. & Food Chem., vol. 2, Aug. 18, 1954, pages 864–870.

JULIAN S. LEVITT, *Primary Examiner.*

LEWIS GOTTS, *Examiner.*